United States Patent [19]
Cross et al.

[11] 4,064,535
[45] Dec. 20, 1977

[54] METHOD AND APPARATUS FOR EFFECTING MULTIPLE SPECTRAL WAVELENGTH IMAGING WITH INFRARED TELEVISION

[75] Inventors: Edward F. Cross, Los Angeles; Munson A. Kwok, Santa Monica; Daniel C. Jonuska, Frazier Park, all of Calif.

[73] Assignee: The United States of America as represented by the Secretary of the Air Force, Washington, D.C.

[21] Appl. No.: 706,321

[22] Filed: July 19, 1976

[51] Int. Cl.² .............................................. H04N 5/33
[52] U.S. Cl. .................................... 358/113; 250/339; 350/166
[58] Field of Search ................. 358/113, 253, 225; 250/333, 330, 334, 339; 350/166; 356/110

[56] References Cited
U.S. PATENT DOCUMENTS

| 2,834,246 | 5/1958 | Foskett et al. ............... 350/166 X |
| 3,039,362 | 6/1962 | Dobrowolski ................... 350/166 |
| 3,046,441 | 7/1962 | De Vore ........................ 358/113 |
| 3,641,344 | 2/1972 | Markle ......................... 250/339 |

OTHER PUBLICATIONS

Applied Optics, vol. 14, No. 12, pp. 3086-3091, Dec. 1975.

*Primary Examiner*—Robert L. Richardson
*Attorney, Agent, or Firm*—Joseph E. Rusz; Willard R. Matthews, Jr.

[57] ABSTRACT

The processing by an infrared television system of field of view radiant emission data such as spatial, radiometric and spectral information is facilitated by apparatus and operating methods that utilize a rotatable narrow band interference filter. The filter intercepts radiant emission from a selected scene at a 0° angle of incidence and at other selected angles of incidence up to 45°. Distinguishing between laser and graybody targets is accomplished by continuously rocking the filter between 0° and 45° at the television vidicon scanning rate or some harmonic thereof.

2 Claims, 4 Drawing Figures

4,064,535

METHOD AND APPARATUS FOR EFFECTING MULTIPLE SPECTRAL WAVELENGTH IMAGING WITH INFRARED TELEVISION

STATEMENT OF GOVERNMENT INTEREST

The invention described herein may be manufactured and used by or for the Government for governmental purposes without the payment of any royalty thereon.

BACKGROUND OF THE INVENTION

The invention relates to infrared television systems, and in particular to methods and means for improving the radiant emission data processing capabilities of such systems.

The radiant emission data processing functions of an infrared television system are commonly carried out with either a filter wheel or with specially designed "rotating" filters such as the circular transmitting filter manufactured by Optical Coating Laboratory, Inc. A filter wheel, however, does not readily permit a continuous search in either time or wavelength; and circular filters do not afford the spectral resolution or large clear aperture required in most applications. Although the insertion of a series of discrete filters can also achieve similar results the transition times introduced between filter changes constitute periods during which the television system cannot view the scene without loss in optical collecting efficiency. Furthermore, all state-of-the-art devices are mechanically complex and make device cooling difficult in instances where high sensitivities are required. There currently exists, therefore, the need for new techniques and apparatus capable of providing spectral data without significant loss in system resolution, sensitivity, or optical collecting efficiency. The present invention is directed toward satisfying this need.

SUMMARY OF THE INVENTION

The apparatus of the invention comprises a narrow band interference filter that is positioned to intercept the radiant emission received by an infrared television camera. Means are provided to incline the filter relative to the radiant emission at various angles of incidence ranging from 0° to 45°. Means are also provided to continuously rock the filter between the angles of 0° and 45° at the television vidicon scanning rate and at harmonies thereof. The methods of the invention provide for various processing procedures with the filter at 0° and other incident angles. These methods and apparatus enable an infrared television system to view a scene in a continuous multiplicity of narrow spectral bandwidths with a minimum number of moving parts while retaining high optical efficiency. By proper application of the techniques hereinafter disclosed, the spectroscopy of the target emissions from all or part of the scene can be studied within the available range of spectral bandwidths. Alternatively, the intensity pattern with wavelength, or the infrared signature or target discrimination, of all or part of the scene can be determined within the available spectral range. For some applications the invention is useful to increase system dynamic range by reducing the incoming irradiance from strong line spectral emission (i.e., laser energy or special "hot" sources) while retaining, relatively, the same system sensitivity to graybody and/or blackbody targets in the same field-of-view.

It is a principal object of the invention to provide a new and improved method of multiple spectral wavelength imaging with an infrared television camera.

It is another object of the invention to provide new and improved apparatus for multiple spectral wavelength imaging.

It is another object of the invention to provide methods and apparatus adapted to provide spectral data for infrared television system without significant loss in system resolution sensitivity or optical collecting efficiency.

These, together with other objects, features and advantages of the invention, will become more readily apparent from the following detailed description when taken in conjunction with the illustrative embodiment in the accompanying drawings.

DETAILED DESCRIPTION OF THE PREFERRED EMBODIMENT

The basic technique of the invention is founded on the physical principle that when a narrow band interference filter is tilted to make an increasingly greater angle of its normal with the optical axis, the filter bandpass shifts toward the shorter wavelengths. This optical effect is caused by relative increases in coating thicknesses of the thin films as the filter is positioned at progressively greater angles. Only one dielectric filter of sufficient aperture is used in the novel spectrally scanning infrared television system comprehended herein as opposed to a filter wheel on the specially designed "rotating" filters commonly used in state-of-the-art systems. The single, a large aperture, narrowband filter employed allows a continuous wavelength scan with good spectral resolution.

Figure 1:
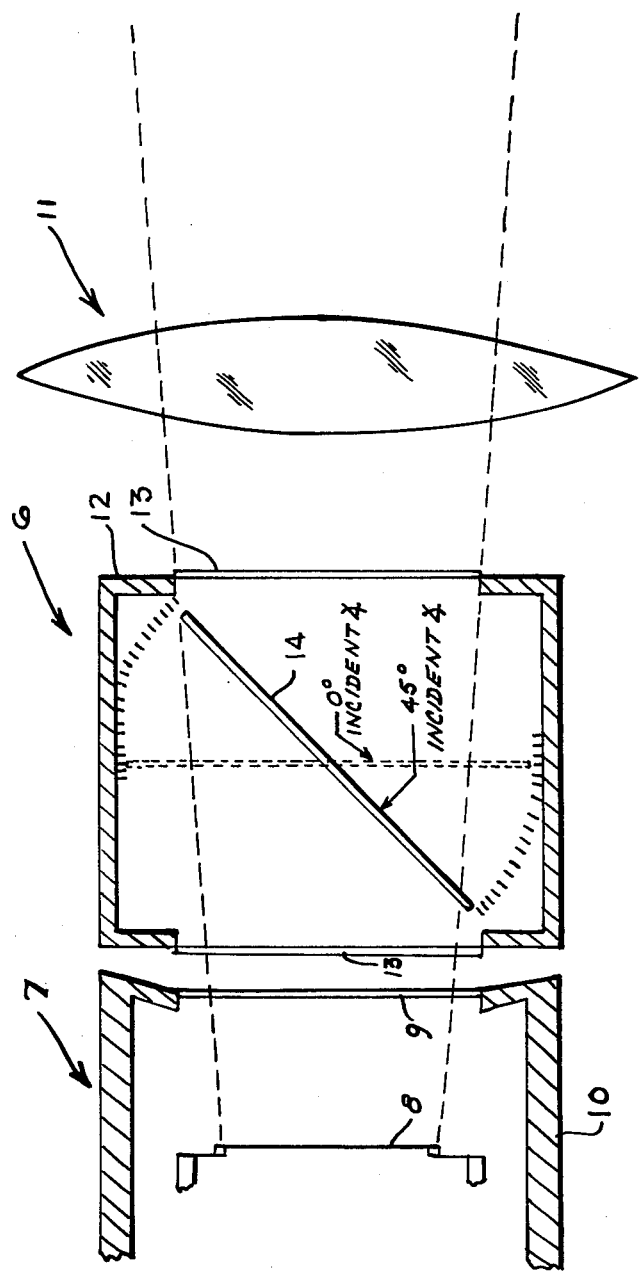
FIG. 1 illustrates, in section, the narrow band dielectric filter of the invention in relationship to the infrared television system.
Figure 2:
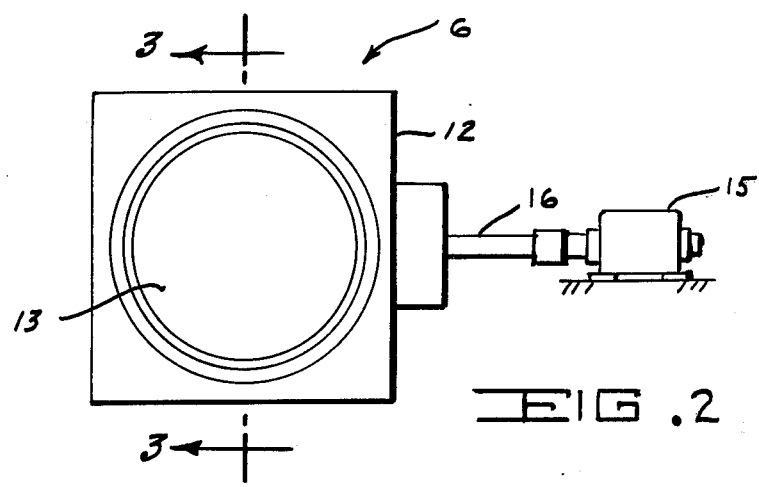
FIG. 2 is a front view of the coolant housing structure for the dielectric filter.
Figure 4:
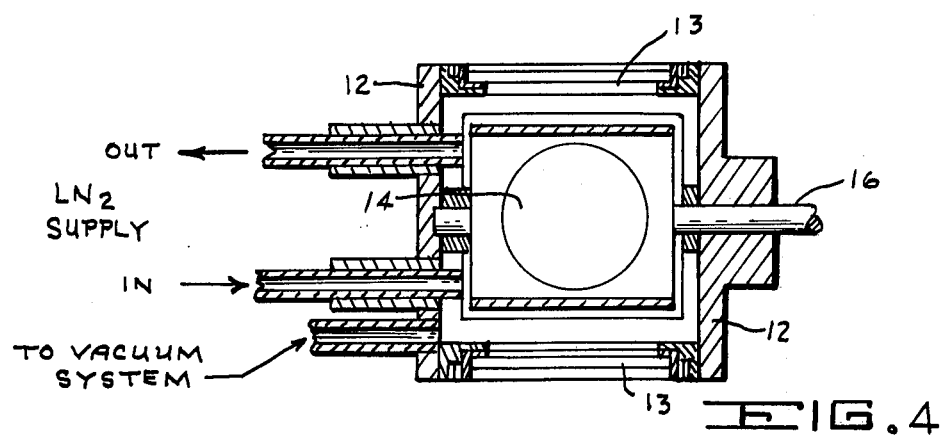
FIG. 4 is a sectional view of FIG. 3 taken at 4—4.
Figure 3:
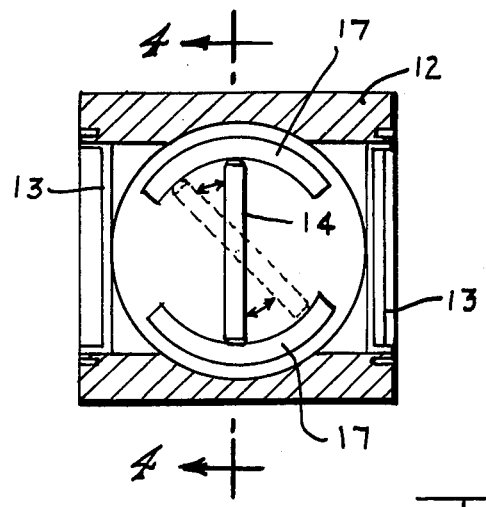
FIG. 3 is a sectional view of the structure of FIG. 2 taken at 3—3.

Referring now to FIG. 1, there is illustrated thereby the pertinent components of an infrared television system incorporating the principles of the invention. These components comprise infrared vidicon 7 (consisting of housing 10, camera tube window 9 and camera tube sensing layer 8), filter cooling and filter mechanism 6 (consisting of narrow band dielectric filter 14, housing 12 and sapphire windows 13) and infrared optical imaging system 11. A more detailed illustration of filter cooling and filtering mechanism 6 is shown by FIGS. 2, 3, and 4. Dielectric filter 14 is mounted on shaft 16 and can be rotated incrementally or continuously rocked by means of stepping motor 15 or any other suitable mechanical device. Coolant housing 17 receives liquid nitrogen or other suitable coolant fluid from an externally positioned source.

In the type of system described above, operation of the camera tube 7 is set up in the normal manner with narrow band filter 14 located between optics 11 and tube faceplate as shown in FIG. 1. Initially the camera system is focused and operated in the normal manner with the filter 14 at 0° incident angle with incoming irradiance (i.e., parallel to the optical elements and camera tube faceplate). With this arrangement, system spectral response is determined by filter characteristics at 0° incident angle. Then as the filter is tilted the system spectral response is shifted downward with bandwidth remaining relatively constant.

The magnitude and sharpness of this down shift in filter spectral characteristics is primarily dependent on the thickness, refractive indices and precision in deposition of the filter coating materials. Based on spectral scans taken on a variety of infrared filters and on published data, the variation in filter characteristics as function of optical incident angle can be closely estimated. In most cases the change from 0° to 45° incident angle results in between a 2.5 and 5.0 percent decrease in filter center wavelength, bandwidth widening of approximately 10 percent, and a loss in transmission efficiency of approximately 5 percent. Between 0° and 10° incident angle, there is no discernible change in filter characteristics but above 10° incident angle the decrease in center wavelength was found to be very noticeable. The above values are only applicable for infrared filters which have bandwidths less than $0.10\mu$. Filters that have greater than $0.10\mu$ bandwidth in general lose significant transmission efficiency and exhibit greater bandwidth widening above 30° incident angle.

By way of example, various applications of the invention are described in the following paragraphs. In each of these systems the tilting of the narrow band filter is used to obtain greater information pertaining to the target within the field of view.

The initial applications are concerned with chemical laser diagnostics in the mid-infrared spectral region. A television system using an infrared camera tube is set with a tiltable narrowband filter ($0.02\mu$ bandwidth) installed between optics and tube faceplate. This filter should be designed for optimum performance at the longest wavelength of interest. If high sensitivities are required, the filter can be cooled to 77° K within a frost-free chamber and adjusted by external rotation of a small positioning shaft similar to the design shown in FIGS. 2-4. The television system can be used to view either the radiating gaseous medium in the laser cavity or the output laser beam impinging on a diffuse reflector with the filter initially at 0° incident angle with incoming irradiance. After this data is obtained, the filter is tilted to an incident angle which permits viewing of the same scene at a lower wavelength band without any loss in resolution.

As an example, the radiating laser medium emits a number of vibrational-rotational lines of HF corresponding to a number of vibrational levels. The reaction zone patterns for HF(2) can be studied by sitting on the $P_2(7)$ line at 2.875 micron at 0° with a narrow band (0.016 micron) filter. The downshift in center wavelength at 45° is ~0.08 microns so in succession the $P_3(3)$ and $P_2(6)$ lines can be studied and, therefore, HF(3). In this case 4→3 lines are too weak and 1→0 lines are at large J, and can be eliminated with an HF gas filter. In principle $P_2(7)$ and $P_2(6)$ can give a rotational temperature of the gas and the additional knowledge of $P_3(3)$ permits gain estimates on the 3→2 band. Another feasible combination is $P_2(4) - P_1(7)$.

The study of the output laser beam using a diffuse reflector permits near and far field beam quality measurements from a specific laser cavity arrangement. Specifically the transverse mode patterns can be observed as well as their slow time variations (because of the vidicon temporal resolution of 20 msec.) The variable band filter here makes it possible to analyze the spectral distribution of HF V-R lines within the modes in multiline operation and the spectral purity of the modes is ostensibly single line operation. Evidence of heating of a diffuse surface can also obviously be evaluated by examining wavelengths intermediate to the HF lines and looking for the blackbody or graybody radiance from the surface. Coupling with another device for further beam analysis is possible. The use of a polarizer-analyzer within the beam path can give information on the degree of polarization of individual HF laser lines under appropriate operating conditions. This same result could be achieved by inserting a filter for each spectral region of interest, but this approach would require a multiplicity of expensive narrow band filters and cannot offer the versatility of selecting a continuum of spectral wavelengths corresponding to the 0° to 45° tilt range.

A second application utilizes this filter tilting technique for attenuating laser wavelengths in an infrared scene at a second wavelength region. In this configuration the invention can be used for evaluating, testing and monitoring $CO_2$ laser systems with a long wavelength infrared (LWIR) television system. The narrowband filter is inserted between camera tube faceplate and optics and spectrally should be centered at $10.60\mu$ with a 0.25 bandwidth or less. If the camera tube has a cooled photoconductive sensing layer, this filter must also be cooled to liquid nitrogen temperature. When this filter is parallel to the tube faceplate, the television system has optimum sensitivity at the laser wavelength, $10.60\mu$. However, as the filter is tilted, the laser energy is attenuated but any gray or blackbody irradiance signals in the field of view remain at nearly the same signal level. Therefore by controlling the filter's angular tilt, laser radiation in the scene can be reduced to any suitable level or completely rejected while detectable black or graybody irradiance signals in the field of view can be monitored. For example, the total absorbed and reflected energy resulting from a $CO_2$ laser striking a specific surface can be viewed with the filter in the normal parallel position by tilting the filter to where the laser is rejected and only the absorbed energy (re-emitted as heat) is viewed by the television system. Also the filter can be designed to transmit at the laser wavelength when tilted at 45° and then observe graybody and/or blackbody irradiance at higher wavelengths with 0° tilt. The decision to received spectral emission from wavelengths above or below the laser wavelength should be based on the spectral response of the camera tube sensing layer and variation in filter characteristics as the incident angle is increased.

It is clear that the ideas suggested in the preceding two wavelength regimes can be generalized to any infrared wavelength region at which the camera system and the narrow band filters are available.

A third application of this technique is for target discrimination by monitoring variations in signal irradiance with changes in spectral bandpass. Since voltage signal-to-envelope noise ratio ($V_s/V_{en}$) on a given video line varies with signal irradiance reaching the camera tube faceplate, the spectral distribution of target radiance will produce a corresponding change in output $V_s/V_{en}$ as a narrow band filter in the optical path is tilted relative to incoming irradiance. This effect can be used to discriminate between black or graybody radiation or a background or other source and the extraordinary infrared spectral emission from targets within the spectral variation range of the filter. Such extraordinary emissions are generated by the operation of motors and equipment, and personnel. The technique is directly applicable for determining if an observable target within the field of view is a gray or blackbody radiator or spectral, dependent emitter. For each target type, the $V_s/V_{en}$ would change in a different manner as the filter was tilted to selected positions corresponding to differing spectral bandpasses.

For example, the irradiance signal from a truck exhaust could be distinguished from fire by observing $V_s/V_{en}$ variations in the 3.30 to 3.50 micron band. A truck exhaust will have a significantly higher irradiance level when the filter is tilted to pass wavelengths between 3.35 and 3.40 microns. When filter orientation is set to pass 3.40 to 3.50 microns, the truck exhaust provides a significantly lower irradiance signal. For a gray or blackbody source such as a fire the irradiance signal is a continuum which changes less significantly as the filter is tilted to scan the 3.30 to 3.50 micron band.

A fourth application of this invention is for distinguishing between laser and graybody targets within a given optical field of view. In this operational mode, the narrow band filter in front of the vidicon faceplate (typically centered at either 2.8, 2.9, 3.8, or 10.6 $\mu$m) has a continuously rocking motion with frequency at the vidicon scanning rate (usually 60 frames per second) or some harmonic of this rate. By observing variations in voltage signal to envelope noise ratio ($V_s/V_{en}$) on a frame line that includes the image, the target specular or graybody irradiance ($H_s$) can be determined from measured vidicon transfer characteristics ($H_s$ versus $V_s/V_{en}$). For laser radiation the $V_s/V_{en}$ will be high only when filter angular position permits transmission of the laser wavelength. For a graybody target $V_s/V_{en}$ does not change sharply as the filter is tilted through the range of angular positions. Therefore, target type can be recognized by measuring $V_s/V_{en}$ from adjacent frames on a live selector oscilloscope. For example, if an unknown radiation source is emitting in the 2.6 to 2.9 $\mu$m region, this technique can determine if the target is an HF laser operating at 2,800 $\mu$m. The narrow band filter designed for this application should have $\lambda_0 = 2.825$ $\mu$m and $\Delta\lambda = 0.25$ $\mu$m when making 0° incident angle with incoming radiation which then decreases to $\lambda_0 = 2,800$ $\mu$m at 30° incident angle and to $\lambda_0 = 2.775$ $\mu$m at 45° as $\Delta =$ remains constant. By stepping the filter to each tilt position for 16.7 milliseconds on a periodic basis, the $V_s/V_{en}$ on adjacent frames can be compared to establish whether detected target radiation is limited to a single spectral line.

In summary, this new technique enables an infrared camera tube to provide not only spatial and radiometric data but also spectral information on detectable targets within the optical field of view. This spectral data can be achieved with no significant loss in system resolution, sensitivity, or optical collecting efficiency.

The concepts of this invention can be applied to any camera or imaging system or image converter system at any wavelength where very narrowband optical filters can be used.

While the invention has been described in one presently preferred embodiment, it is understood that the words which have been used are words of description rather than words of limitation and that changes within the purview of the appended claims may be made without departing from the scope and spirit of the invention in its broader aspects.

What is claimed is:

1. The method of multiple spectral wavelength imaging with an infrared television camera having a vidicon image tube to distinguish between laser and graybody targets comprising the steps of directing said infrared television camera to view a selected scene, positioning a narrow band dielectric filter adjacent the camera receiving aperture and in intercepting relationship with radiant emission from said selected scene, processing received field of view radiant emission data taken by said infrared camera while the incident angle of said filter is continuously varied between 0° and 45° at the television vidicon image tube scanning rate, and comparing variations in voltage signal to envelope noise ratios of received radiant emission to distinguish characteristic laser and graybody target irradiance patterns.

2. The method of multiple spectral wavelength imaging defined in claim 1 wherein said received field of view radiant emission data is processed while the incident angle of said filter is continuously varied between 0° and 45° at a harmonic of the television vidicon image tube scanning rate.

* * * * *